United States Patent [19]

Sashiki et al.

[11] Patent Number: 4,511,010
[45] Date of Patent: Apr. 16, 1985

[54] COMBINATORIAL WEIGHING METHOD AND APPARATUS THEREFOR

[75] Inventors: Takashi Sashiki, Nagaokakyo; Keiko Sakaeda, Kyoto, both of Japan

[73] Assignee: Kabushiki Kaisha Ishida Koki Seisakusko, Kyoto, Japan

[21] Appl. No.: 531,401

[22] Filed: Sep. 12, 1983

[30] Foreign Application Priority Data

Sep. 11, 1982 [JP]  Japan ................... 57-158347

[51] Int. Cl.³ ............... G01G 19/04; G01G 19/00
[52] U.S. Cl. ............................. 177/25; 177/1; 177/50
[58] Field of Search ............... 177/1, 25, 50, DIG. 12

[56] References Cited

U.S. PATENT DOCUMENTS 4,385,671  5/1983  Hirano ...................... 177/25

Primary Examiner—E. A. Goldberg
Assistant Examiner—Fred L. Kampe
Attorney, Agent, or Firm—Staas & Halsey

[57] ABSTRACT

In a combinatorial weighing system in which weight data from a plurality of weighing machines containing articles are combined to obtain an optimum combination of weighing machines giving a total combined weight value of articles equal to a target value or closet to the target value within preset allowable limits, and in which the articles are discharged from the obtained optimum combination of weighing machines, the number of weighing machines is increased over that provided in the conventional apparatus, and the number of weighing machines that participate in combinations is varied in accordance with the target value. Further, a limit value for a number of combinations giving at least one total combined weight value within the preset allowable limits is predicted, and it is determined after a combinatorial computation, whether a number of combinations in excess of the limit value remain. If the decision is affirmative, then a second combinatorial computation is performed without any further supply of articles being carried out, and a desired combination is obtained from among the weighing machines that have not yet been selected, i.e., those weighing machines that have not yet discharged their articles.

9 Claims, 5 Drawing Figures

COMBINATORIAL WEIGHING METHOD AND APPARATUS THEREFOR

BACKGROUND OF THE INVENTION

This invention relates to a combinatorial weighing method and apparatus therefor and, more particularly, to such method and apparatus wherein, if certain conditions are satisfied, two or more appropriate combinations of weighing machines are obtained by just one supply and weighing cycle, followed by discharging articles from each combination of weighing machines in successive fashion.

A combinatorial weighing appartus has a plurality of weighing machines each consisting of a weighing hopper and a weight sensor associated with the weighing hopper. According to a known combinatorial weighing method and apparatus therefor, combinatorial weighing is carried out by weighing articles which have been introduced into the weighing hoppers of the weighing machines, selecting the combination of weighing machines (referred to as the "optimum" combination) that gives a total weight value equal to a target value or closest to the target value within preset allowable limits, discharging only those articles contained by the weighing hoppers of the selected weighing machines, and subsequently replenishing the emptied weighing hoppers with new articles to prepare for the next weighing cycle. The foregoing sequence of steps is repeated to carry out a continuous, highly accurate weighing operation automatically.

FIG. 1 illustrates, in diagrammatic form, the mechanism of a combinatorial weighing appartus for practicing the above-described weighing method. Numeral 1 denotes a main feeder of vibratory conveyance type. Articles to be weighed are introduced into the main feeder 1 and imparted with vibratory motion for a predetermined length of time so as to be dispersed radially outward from the center of the main feeder. Numerals 2, 2 . . . denote n-number of weighing stations which are arranged around the main feeder 1 along radially extending lines to receive the articles dispersed by the main feeder. Each weighing station 2 includes a dispersing feeder 2a, a pool hopper 2b, a pool hopper gate 2c, a weighing hopper 2d, a weight sensor 2e, and a weighing hopper gate 2f. The dispersing feeder 2a comprises an independently vibratable conveyance device for feeding the articles by means of vibration, or an independently operable shutter. In either case, each dispersing feeder 2a is so arranged that the articles received from the centrally located main feeder 1 can be introduced into the corresponding pool hopper 2b disposed therebelow. The pool hopper gate 2c is provided on each pool hopper 2b in such a manner that the articles received in the pool hopper 2b are released into the weighing hopper 2d when the pool hopper gate 2c is opened. Each weighing machine is composed of a weighing hopper 2d and a weight sensor 2e attached thereto. The weight sensor 2e is operable to measure the weight of the articles introduced into the weighing hopper 2d of the weighing machine, and to apply an electrical signal indicative of the measured weight to a combination control unit, not shown. The combination control unit then selects the combination of articles (the "optimum" combination) which gives a total weight equal to a target value or closest to the target value within preset allowable limits. Each weighing hopper 2d is provided with its own weighing hopper gate 2f.

Upon receiving the signals from each of the weight sensors, a drive controller, not shown, produces a signal to open only the weighing hopper gates 2f of those weighing hoppers 2d that give the optimum combination, these gates 2f discharge the articles from the corresponding weighing hoppers 2d in a common chute 3 where they are collected together. The collecting chute 3 has the shape of a funnel and is so arranged as to receive the articles from any of the circularly arrayed weighing hoppers 2d via the hopper gates 2f, which are located above the funnel and substantially along its outer rim. The articles received by the collecting chute 3 are collected at the centrally located lower end thereof by falling under their own weight or by being forcibly shifted along the inclined wall of the funnel by a mechanical scraper or the like, which is not shown. The collecting chute 3 is provided with a timing hopper 4 at the lower end thereof, for temporarily holding the collected articles. The arrival of an externally applied release signal from a packaging machine or the like causes the timing hopper 4 to release the retained articles from the system.

The foregoing combinatorial weighing apparatus is an extremely useful machine for obtaining the optimum combination of articles having a total combined weight equal to the target value or closest to the target value within the preset allowable limits. The obtained combination of articles is discharged from the apparatus.

There are instances where the target value used in the combinatorial computations is not fixed, even for articles of the same type. The reason is that it is sometimes necessary to change the target value setting depending upon the particular production schedule. For example, though the main product in a production line may be 100 g bags of potato chips, there are cases where it is necessary to produce, say, 200 and 500 g bags of potato chips. This means that combinatorial weighing would have to be performed based on target weight values of 100 g, 200 g and 500 g, respectively. In order to execute combinatorial weighing for a plurality of target values by means of a single combinatorial weighing apparatus, a method which will now be described has been developed and put into use in the prior art. In explaining this conventional method, we will assume that 100 g, 200 g and 500 g bags are to be produced, and that the processing must be carried out at a rate of 120, 60 and 24 weighing cycles per minute, respectively. The method is as follows:

(1) Means are taken to achieve high-speed weighing so that the combinatorial weighing apparatus can perform combinatorial weighing at a rate of up to 120 weighing cycles per minute. To this end, two combinations each giving a total combined weight within the preset allowable limits are obtained for each article supply and weight measurement cycle, and the articles are discharged from the weighing machines belonging to each combination. By obtaining two combinations for each single supply and weight measurement cycle in this manner, the time required for weight measurement is reduced. That is, since weighing machines tend to oscillate when supplied with articles, a weight measurement cannot begin until enough time needed for the weighing machines to stabilize has passed. When just one combination is obtained per cycle, the waiting time of a prescribed duration is required between each and every combination in order for the weighing machines to stabilize. By obtaining two combinations per cycle, therefore, the waiting time is required only between every two combinations.

(2) Whenever a target value setting is changed, the amount of articles supplied to each weighing machine is adjusted to obtain the highest weighing accuracy. To accomplish this, the number of weighing machines selected as the optimum combination for the purpose of discharging their articles is rendered virtually constant irrespective of the target value. The adjustment of the amount of articles supplied to the weighing machines requires that the weighing accuracy be checked so that fine adjustments can be made.

(3) The combinatorial weighing apparatus must have a rigid construction strength and hopper capacity, capable of weighing out 500 g of articles. At the same time, the apparatus must be capable of weighing out 100 g of the articles. To these ends, a weighing computing mechanism must be adapted to provide two sets of results with just one article supply operation.

According to the prior art, therefore, the change in target value is dealt with by designing a combinatorial weighing apparatus in accordance with items (1) to (3). However, with the conventional method, the amount of articles supplied to each of the weighing hoppers must be adjusted in accordance with the change in target value, so that a rapid changeover from one target value to another cannot take place. In addition, when a weighing hopper designed to handle a larger volume of articles is used for articles occupying only a small volume, the articles are required to fall a greater distance because of the larger dimensions involved. This causes the articles to sustain damage upon impact when they are released from the hopper. Furthermore, in order to execute combinatorial processing at a rate of 120 weighing operations per minute when weighing out large volumes of articles, the production rate of the overall system must be raised a stroke, or else the supply of articles from an earlier stage of the production line will not be able to keep pace, thereby resulting in a shortfall of the articles supplied. Conversely, when weighing out articles in small volumes, there is a tendency for articles to be supplied in an overabundance from the earlier stage of the production line.

SUMMARY OF THE INVENTION

An object of the present invention is to provide a novel combinatorial weighing method and apparatus therefor, wherein combinatorial weighing can be performed with excellent efficiency by a single combinatorial weighing apparatus even in cases where a target value is altered during a weighing operation.

Another object of the present invention is to provide a novel combinatorial weighing method and apparatus therefor, wherein combinatorial weighing can be performed at high speed by dispensing with the need to adjust the supply of articles delivered to weighing machines to cope with a change in target value.

According to the present invention, the foregoing objects are attained by providing a combinatorial weighing system in which the number of weighing machines is increased over that provided in the conventional apparatus, and the number of weighing machines that participate in combinations is varied in accordance with the target value. Further, a limit value for a number of combinations giving at least one total combined weight value within the preset allowable limits is predicted, and it is determined after a combinatorial computation whether a number of combinations in excess of the limit value remain. If the decision is affirmative, then a second combinatorial computation is performed without any further supply of articles being carried out, and a desired combination is obtained from among weighing machines that have not yet been selected, i.e., those weighing machines that have not yet discharged their articles.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
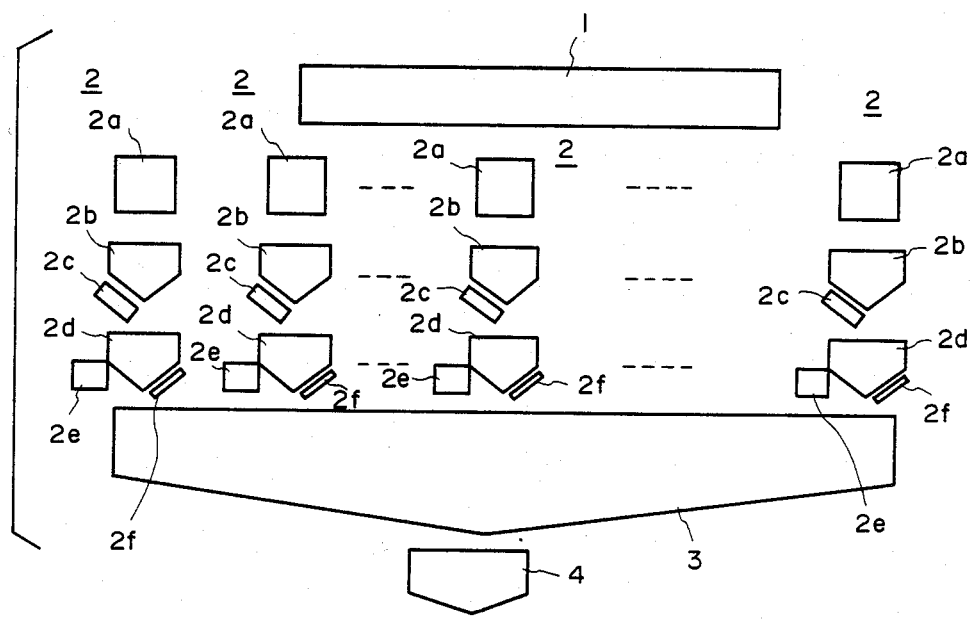
FIG. 1 is a schematic view of the mechanism of a combinatorial weighing apparatus for practicing a combinatorial weighing method.

The general features of a combinatorial weighing method according to the present invention will be described before discussing a preferred embodiment of the invention in detail.

In an ordinary combinatorial weighing method, one set of results usually is obtained for a single supply and weight measurement cycle. In such case, if the weighing apparatus is provided with between eight and ten weighing machines, then an optimum combination giving a combined total weight value within preset allowable limits can be obtained. The total number of possible combinations will be 255 with eight weighing machines, 511 with nine, and 1023 with ten. Of course, all of the combined total weight values provided by these combinations will not fall within the preset allowable limits, but it is known that combined total weight values provided by combinations each composed of approximately half the total number of weighing machines frequently do reside with the allowable limits. The reason is as follows. The number of combinations that can be computed by a combinatorial weighing apparatus composed of N weighing machines, where a combination may be made up of only one weighing machine or up to all N of the weighing machines, is $2^n - 1$. When N is even, combinations composed of N/2 weighing machines (i.e., half the total number) will be the largest in number among the $2^n - 1$ combinations. When N is odd, combinations composed of $(N+1)/2$ or of $(N-1)/2$ weighing machines will be the largest in number among the $2^n - 1$ combinations. For example, when N=10, only ten combinations made up of one weighing machine each will exist, whereas the number of combinations composed of five (i.e., N/2) weighing machines will be 252 in number. Accordingly, it will be possible to achieve good accuracy by adjusting the amount of supply in such fashion that the total combined weight values provided by combinations selecting N/2 or $(N\pm1)/2$ weighing machines will be equal to the target value or fall within the preset allowable limits. In other words, in a combinatorial weighing apparatus having N-number of weighing machines, where it is attempted to weigh out X g of the articles (i.e., where the target weight value is X g), the amount of articles supplied to each weighing machine should be made to have an average value of 2X/N g when N is even, and 2X/(N+1) or 2X/(N−1) g when N is odd. Where such an adjustment is made, combinations inclusive of the sought combinations will be those composed of approximately half the total number of weighing machines. If the number of combinations required is considered in terms of this standard, then, in the prior art, the sought combinations will be searched for among 1000 to 500 combinations.

The number of combinations necessary for obtaining the required accuracy will depend upon such conditions as the properties of the articles, the state in which they are supplied, and the values being weighed out. However, it is possible to estimate the number before the weighing operation starts. Assume that the number of necessary combinations is p, and let N represent the total number of weighing machines, n the number of weighing machines that participate in a combinatorial computation, and m the number of weighing machines selected. If the relation given by:

$$_nC_m \geq p \quad (1)$$

where n≦N, is found to hold, then a supply and weight measurement cycle is performed and a first combinatorial computation is executed among the n weighing machines. If we assume that the number of weighing machines selected is a (=m), then the next combinatorial computation will be performed among (n−a) weighing machines. The total number of combinations will be $_{n-a}C_m$. If this number is found to be greater than p, then a combination giving a total weight value within the preset allowable limits is obtained from (n−a) weighing machines, and the articles are discharged from the weighing machines belonging to this combination. Thereafter, the foregoing processing is repeated in the same manner until the required number of combinations (equal to or greater than p) is no longer obtained.

Figure 2:
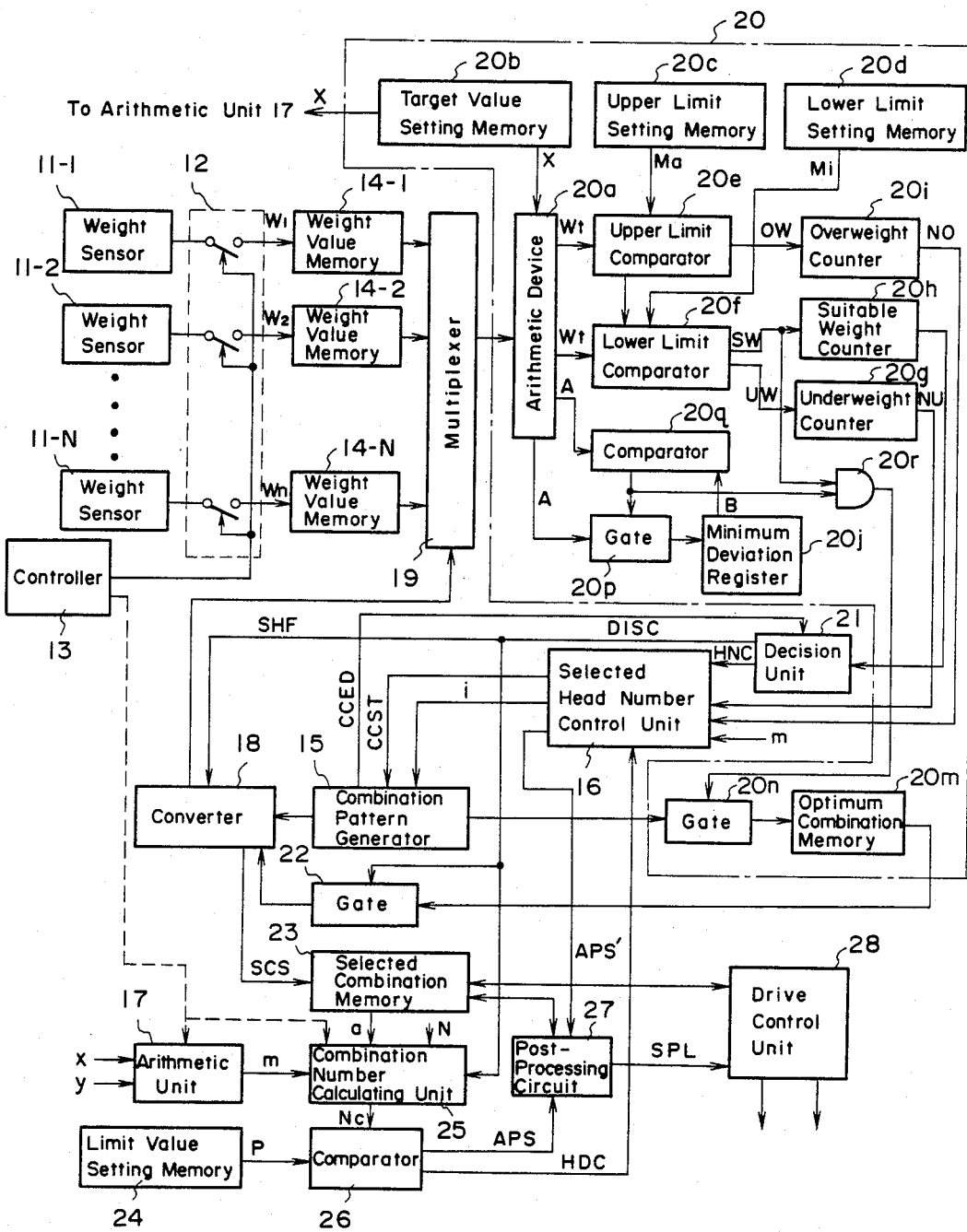
FIG. 2 is a block diagram of an embodiment of a combinatorial weighing apparatus according to the present invention.

FIG. 2 is a block diagram of an embodiment of the present invention. Reference numerals 11-1, 11-2, ... 11-N denote weight sensors coupled to respective weighing hoppers, which are not shown in FIG. 2. The outputs of the weight sensors are applied to respective normally-open switches constituting a gate 12. After the weighing hoppers are supplied with articles to be weighed, a controller 13 applies a control signal to the gate 12 when the weighing machines have stabilized, thereby closing the switches for a predetermined period of time so that the weight value outputs W1, W2, ... WN from the weight sensors 11-1, 11-2, ... 11-N may be transferred to respective weight value memories 14-1, 14-2, ... 14-N. Numeral 15 denotes a combination pattern generator which, in accordance with a head number command i from a selected head number (weighing machine number) control unit 16 calling (for the selection of i-number of weighing machines, produces a bit signal in which only the i-number of bits, from among the number N thereof, are raised to logical "1". The initial value m of i is given by:

$$m = INT[X/y] \quad (2)$$

where y(g) is the average weight of articles supplied to each weighing machine, and X(g) is the target weight value. (It should be noted that INT[X/y] is an integral value nearest to X/y but not less than X/y. Eq. (2) is computed by an arithmetic unit 17. Numeral 18 designates a converter for storing correspondence between each weighing machine and each bit position of the bit pattern generated by the combination pattern generator 15, and for converting the bit pattern into a combination signal by using the correspondence. More specifically, since the i-th bit of the bit pattern will not correspond to the i-th (No. i) weighing machine, an adjustment for this is effected by the converter 18. By way of example, this will be described for a case where an optimum combination, which gives a total weight value within the preset allowable limits and closest to a target value, is obtained from among all combinations that select five (m=5) weighing machines from 14 (N=14) weighing machines. Initially, the assumption will be that only ten of the 14 weighing machines are effective (i.e., n=10), so that the optimum combination is obtained from among all $_{10}C_5$ combinations. In this case, the arrangement will be such that the combination pattern generator 15 generates a bit pattern composed of ten bits. The converter 18 has 14 (1st through 14th) memory locations that correspond to the 14 weighing machines No. 1 through No. 14 so that the initial correspondence between the weighing machines and bit positions can be stored. It should be noted that the i-th memory location (i≦10) corresponds to the i-th bit of the bit pattern. Accordingly, if the combination pattern generator 15 generates a bit pattern represented by, e.g., 0101101001, the converter 18, relying upon the stored corresponding relationships, will convert the bit positions into weighing machine numbers and produce a combination signal, which is input to a multiplexer 19. In accordance with the combination signal, the multiplexer 19 sequentially delivers, to a combination computing unit 20, the weight values stored in the weight value memories 14-1, 14-4, 14-6, 14-7, 14-9 corresponding to weighing machine Nos. 1, 4, 6, 7, 9, respectively. The computing unit 20 uses these weight values to execute a combinatorial computation, described below.

When, as a result of a first combinatorial computation, five weighing machines (n=5) Nos. 1, 3, 5, 8 and 10 are selected as giving the optimum combination and the articles that have been supplied to these weighing machines are discharged, processing will subsequently be executed to obtain an optimum combination from among all combinations that select five weighing machines from nine (=14−5) weighing machines. At such time, the converter 18 eliminates the already selected weighing machines from memory and shifts the remaining weighing machine numbers into the character positions left vacant. The resulting corresponding relationships that are stored in the converter are as shown in the following table:

| Memory Location | Bit Position | Weighing Machine No. |
|---|---|---|
| 1st Memory | 1st Bit | No. 2 |
| 2nd Memory | 2nd Bit | No. 4 |
| 3rd Memory | 3rd Bit | No. 6 |
| 4th Memory | 4th Bit | No. 7 |
| 5th Memory | 5th Bit | No. 9 |
| 6th Memory | 6th Bit | No. 11 |
| 7th Memory | 7th Bit | No. 12 |
| 8th Memory | 8th Bit | No. 13 |
| 9th Memory | 9th Bit | No. 14 |

-continued

| Memory Location | Bit Position | Weighing Machine No. |
| --- | --- | --- |
| 10th Memory | Nul l | Nul l |
| 11th Memory | Nul l | Nul l |
| 12th Memory | Nul l | Nul l |
| 13th Memory | Nul l | Nul l |
| 14th Memory | Nul l | Nul l |

Thereforth, when the combination pattern generator 15 generates a bit pattern of nine bits, say 010110110, the converter 18 uses the stored corresponding relationships to produce a combination signal indicative of the weighing machine numbers (Nos. 4, 6, 9, 11, 13) that correspond to the bit positions (see the foregoing table). This signal is applied to the multiplexer 19. In accordance with this signal, the multiplexer 19 sequentially delivers, to the combination computing unit 20, the weight values stored in the weight value memories 14-4, 14-6, 14-9, 14-11, 14-13 corresponding to weighing machine Nos. 4, 6 9, 11, 13, respectively. The computing unit 20 uses these weight values to execute a combinatorial computation.

The combination computing unit 20 comprises an arithmetic device 20a for computing the total weight Wt ($=\Sigma Wi$) of the weight values delivered by the multiplexer 19, and for performing the operation given by:

$$|Wt - Wa| = A \tag{3}$$

to compute the difference between the total weight Wt and the target value Wa, with signals indicative of Wt and A, referred to as a deviation value, being produced as outputs; a memory 20b for storing the set target value Wa; a memory 20c for storing a set weight value Ma, which is the upper limit of the aforementioned preset allowable limits; a memory 20d for storing a set weight value Mi (normally set so as to be equal to the target value), which is the lower limit of the preset allowable limits; an upper limit comparator 20e operable to compare the magnitudes of the total weight Wt and upper limit weight value Ma and to produce an overweight signal OW when Ma<Wt holds; a lower limit comparator 20f operable to compare the magnitudes of the total weight Wt and lower limit value Mi and to produce an underweight signal UW when Mi>Wt holds, or a suitable signal SW when both the overweight signal OW and underweight signal UW are logical "0" (i.e., when Mi≦WT≦Ma holds); an overweight counter 20i, suitable weight counter 20h and underweight counter 20g for storing the number of times the overweight signal OW, suitable weight signal SW and underweight signal UW are generated, respectively; a minimum deviation register 20j in which the difference between the upper limit weight value Ma and the target value Wa is initially set, the state of the register then being updated in a manner described below; an optimum combination memory 20m for storing the bit pattern of the optimum combination, gates 20n and 20p; a comparator 20q for comparing the magnitude of the deviation value A, which is the output of the arithmetic device 20a, with the magnitude of the minimum deviation value B stored in the minimum deviation register 20j; and an AND gate 20r. When the relation A<B holds, the comparator 20q delivers the deviation value A to the minimum deviation register 20j through the gate 20p to store the deviation value in the register, and delivers the prevailing bit pattern from the combination pattern generator 15 to the optimum combination memory 20m through the gate 20n to store the bit pattern in the memory.

The arithmetic device 20a sums the weight values received from the multiplexer 19 to find Wt, obtains the deviation A between Wt and the contents Wa of the target value setting memory 20b, delivers the deviation value A to the comparator 20q and gate 20p, and delivers the total weight value Wt to the upper limit comparator 20e and lower limit comparator 20f. The comparator 20q compares the contents B of minimum deviation register 20j with the deviation A received from the arithmetic device 20a, and delivers an enable signal to the gates 20p, 20n when A is less than B. In response to the enable signal, gate 20p opens to deliver the prevailing deviation A to the minimum deviation register 20j, thereby updating the contents of the register. The input to the gate 20n is a bit signal indicative of the prevailing combination pattern being generated by the combination pattern generator 15, the gate 20n responding to the abovementioned enable signal by delivering the bit signal to the optimum combination memory 20m to update its contents.

Meanwhile, the upper and lower limit comparators 20e and 20f perform a ranking operation by comparing the magnitude of the total weight value Wt with the magnitudes of the upper and lower limit weight values Ma and Mi. The overweight signal OW (logical "1") is generated to increment the overweight counter 20i when Wt>Ma holds, the underweight signal UW is generated to increment the underweight counter 20g when Wt<Mi holds, and the suitable weight signal SW is generated to increment the suitable weight counter 20h when the relation Mi≦Wt≦Ma holds.

When the foregoing processing is completed for all combinations, the optimum pattern generator 15 generates a signal CCED. When this occurs, a decision unit 21, described later, determines whether the state of the suitable weight counter 20h is one or more; if it is, the combination pattern stored in the optimum combination memory 20m is delivered and, through means described later, the articles are discharged from the weighing machines corresponding to the "1" bit positions.

As mentioned above, the decision unit 21 determines, following the generation of the signal CCED, whether the state of the suitable weight counter 20h is one or more. In other words, the decision unit 21 discriminates whether the total weight value of a combination resides within the preset allowable limits. If the state of the counter is one or more, the decision unit 21 issues a discharge enable signal DISC; if it is zero, the unit produces a head number update signal HNC. Numeral 22 denotes a gate which, in response to the discharge enable signal DISC, provides the converter 18 with the combination pattern stored in the optimum combination memory 20m.

When the converter 18 receives the combination pattern from the optimum combination memory 20m via the gate 22, the converter uses the table giving the correspondence between the bit positions and weighing machine numbers to generate a selected combination signal SCS, which is applied to a selected combination memory 23. The corresponding relationships stored within the converter 18 are then updated. The selected combination signal SCS comprises 14 bits, in which the i-th bit corresponds to the No. i weighing machine. Accordingly, if we assume that weighing machine Nos. 1, 2, 7, 9 and 11 are selected, then the selected combination signal SCS will be 00010101000011.

Numeral 24 denotes a limit value setting memory for setting and storing a limit value p for a number of combinations that will provide at least one combined weight value within the preset allowable limits. Numeral 25 denotes a unit for calculating the number of combinations. Let n represent the number of weighing machines that have not yet discharged their articles, i.e., the number of weighing machines that remain unselected. The calculating unit 25, using the initial value m of the selected number of heads computed by the arithmetic unit 17, performs the operation:

$$Nc = {}_nC_m \tag{4}$$

and produces a signal indicative of Nc. It should be noted that n=N holds immediately after the weighing machines are supplied with articles (i.e., at the start of operation). In a case where only n' (<N) weighing machines of the total number N are assumed to be effective at the start of operation, the calculating unit 25 will perform the operation:

$$Nc = {}_{n'}C_m \tag{5}$$

When an optimum combination giving a predetermined number a of weighing machines is selected by the first combinatorial computation and the selected combination signal SCS from the converter 18 is stored in the selected combination memory 23, the latter provides the calculating unit 25 with the number a of selected weighing machines. When the number a arrives from the selected combination memory 23 and the discharge enable signal DISC arrives from the decision unit 21, the unit 25 for calculating the number of combinations performs the following operations:

$$n - a \rightarrow n \tag{6}$$

$$Nc = {}_nC_m \tag{6'}$$

and delivers NC as an output signal. This signal is applied to a comparator 26, which compares the number Nc of combinations with the magnitude of the aforesaid limit value p. When the relation $Nc \geq p$ holds, the comparator 26 produces a head number command signal HDC that is applied to the selected head number control unit 16, in response to which a signal indicative of m is produced, internally of the control unit 16, as the selected head number. This will be described in further detail later. When $Nc \leq p$ holds, the comparator 26 produces a post-processing signal APS. The latter signal is applied to a post-processing circuit 27, which responds by checking the contents of the selected combination memory 23. If the contents of the memory 23 have been cleared, that is, if the selected combination signal SCS has been delivered to a drive control unit 28 to discharge the articles from the selected weighing machines, then the post-processing circuit 27 delivers a supply command signal SPL to the drive control unit 28.

Figure 3:
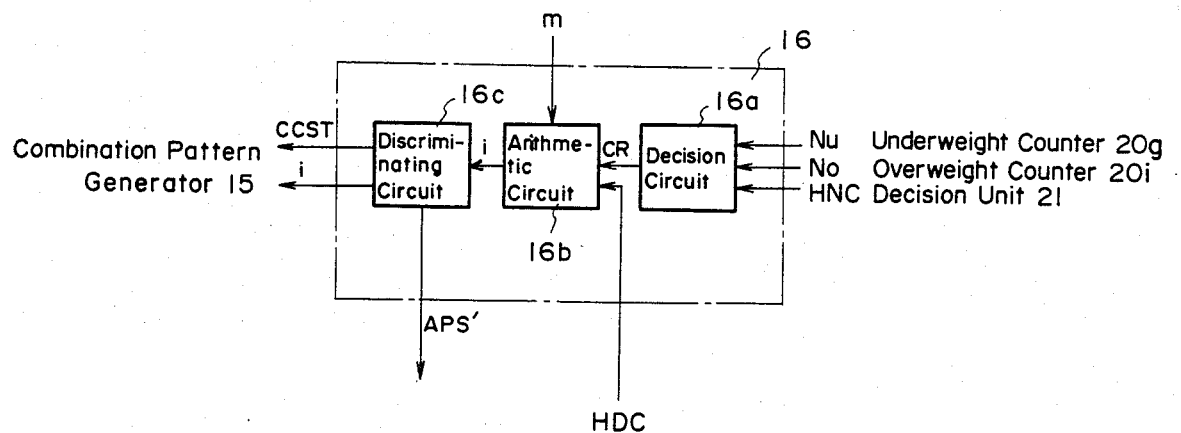
FIG. 3 is a block diagram of a selection head control unit included in the apparatus of FIG. 2.

FIG. 3 is a block diagram of the selected head number control unit 16. If the value of the count in the suitable weight counter 20h (FIG. 2) is zero after all combinations have been computed, the decision unit 21 generates a head number update signal HNC. The selected head number control unit 16 includes a decision circuit 16a which, in response to the signal HNC, compares the count (the number of times an underweight has been detected) $N_U$ in the underweight counter 20g and the count (the number of times an overweight has been detected) $N_O$ in the overweight counter 20i, and produces a signal CR indicative of the results of the comparison. The signal CR is logical "1" when $N_O \geq N_U$ holds, and logical "0" when $N_O < N_U$ holds. The control unit 16 further includes an arithmetic circuit 16b, which receives the signal CR from the decision circuit 16a. When the number Nc of combinations is greater than the limit value p ($Nc \geq p$), that is, when the comparator 26 produces the head number command signal HDC, the arithmetic circuit 16a produces an output m as the selected head number i. On the other hand, in response to generation of the head number update signal HNC, the discriminating circuit 16a compares $N_U$ and $N_O$, as mentioned above. When $N_O \geq N_U$ holds (CR="1"), the arithmetic unit 16b performs the following operation:

$$i \rightarrow m - 1 \tag{7}$$

and delivers this value of i as the selected head number. When $N_O < N_U$ holds (CR="0"), however, the arithmetic unit 16b performs the following operation:

$$i \rightarrow m + 1 \tag{8}$$

and delivers this value of i as the selected head number. The control unit 16 further comprises a discriminating circuit 16c for determining whether the selected head number i from the arithmetic circuit 16b is zero or a number greater than N, delivering a post-processing signal APS' to the post-processing circuit 27 when i=0 or i>N holds, and delivering the combinatorial computation start signal CCST, as well as the selected head number i, to the combination pattern generator 15 when i≠0 and i≤N. When the post-processing signal APS' is generated, the post-processing circuit 27 performs processing similar to that executed when the post-processing signal APS is generated.

Figure 4:
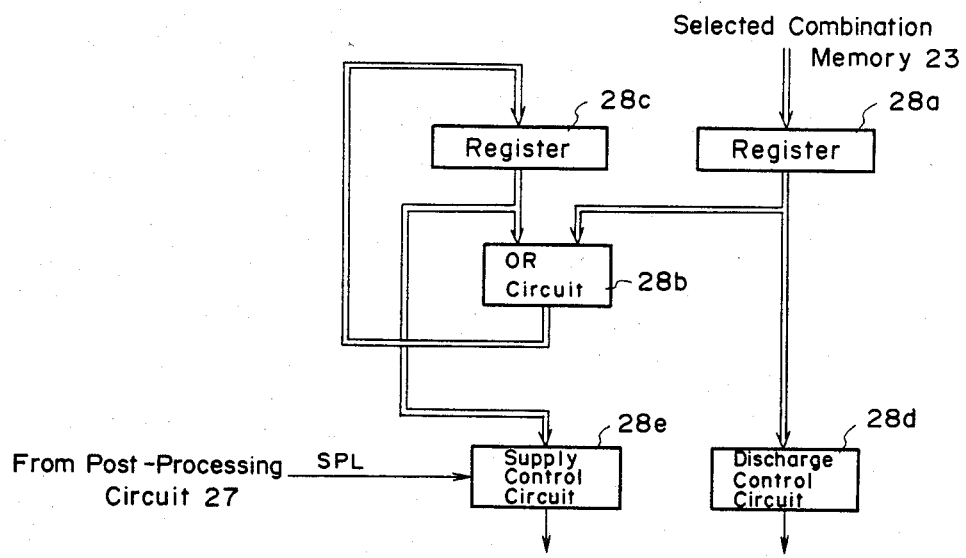
FIG. 4 is a block diagram of a drive control unit included in the apparatus of FIG. 2.

The drive control unit 28 of FIG. 2 is illustrated in detail in the block diagram of FIG. 4. The combination signal from the selected combination memory 23 is stored in a register 28a. From the register the combination signal is applied to an OR circuit 28b for taking the OR between the bits of this signal and the corresponding bits of a register 28c, which records the already selected weighing machines. The output of the OR circuit 28b is applied to a register 28c, in which the initially stored value is all "0"s. The combination signal stored in the register 28a is also applied to a discharge control circuit 28d, thereby opening the weighing hopper gates of the selected weighing machines so that these hoppers discharge their articles into the collection chute 3 (FIG. 1). A signal indicative of the already selected weighing machines, which is stored in the register 28c, is applied to a supply control circuit 28e. Upon receiving the supply command signal SPL from the post-processing circuit 27, the supply control circuit 28e, based on the signal from the register 28c opens the pool hopper gates corresponding to the weighing machines that discharged their articles, thereby supplying these weighing machines with articles anew. Thereafter, the dispersing feeders corresponding to the emptied pool hoppers are vibrated for a predetermined period of time to resupply these pool hoppers.

Figure 5:
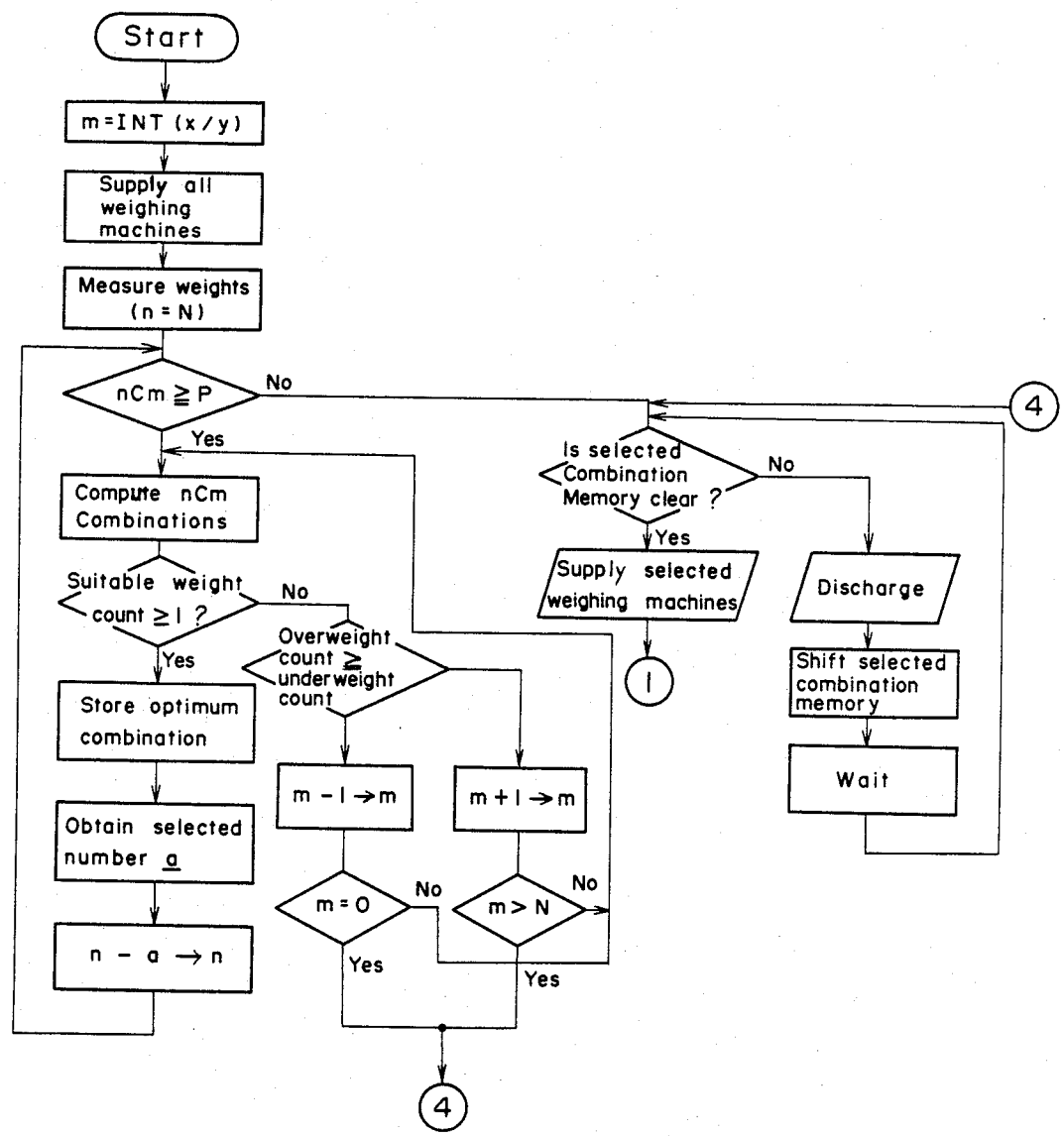
FIG. 5 is a flowchart of the processing involved in the combinatorial weighing method performed by the apparatus of FIG. 2.

FIG. 5, is a flow chart of the processing steps involved in the combinatorial weighing method achieved by the apparatus shown in FIG. 2 and will now be employed to describe the operation of the apparatus.

When a combinatorial weighing operation begins, the arithmetic unit 17 executes the operation of Eq. (2) in response to a command from the controller 13, thereby generating the initial value m of the selected head number. This value is applied to the selected head number control unit 16, and to the unit 25 for calculating the number of combinations. Before or after the operation of Eq. (2), articles, at an average weight of y(g), are charged into all weighing machines and pool hoppers. After the articles have been supplied to each of the weighing machines and the resulting weighing machine oscillations has subsided, the controller 13 applies a gate enable signal to the gate circuit 12 to close, for a predetermined period of time, the normally open switches constituting the circuit. This causes the weight values $W_1$ through $W_N$ from the weight sensors 11-1 through 11-N to be stored in the weight value memories 14-1 through 14-N. Thereafter, the controller 13 commands the calculating unit 25 to calculate the number of combinations. The unit 25 responds by performing the operation of Eq. (4), with n=N, or the operation of Eq. (5), with n=n' (where n'<N), and by delivering the result Nc to the comparator 26. In the illustrated embodiment, Nc is obtained from Eq. (5) where the following are assumed to hold: N=14, m=5, n'=10. The other input to the comparator 26 is the limit value p of the number of combinations, which has been preset and stored in the limit value setting memory 24. Accordingly, the comparator 26 compares Nc and p in magnitude and applies the head number command signal HDC to the selected head number control unit 16 when Nc≧p holds. Note that Nc≧p will hold at the start of operation. When the head number command signal HDC arrives, the selection head control unit 16 provides the combination pattern generator 15 with the combinatorial computation start signal CCST, and with the value m as the selected head number i. The combination pattern generator 15 responds by generating, one after another, all combinations that select m(=5) weighing machines from among the number n'(=10) thereof. Each ten-bit pattern generated by the combination pattern generator 15 is applied to the converter 18 which, based on the correspondence between the bit positions and the weighing machine numbers, converts each pattern into a combination signal that is then applied to the multiplexer 19.

The arithmetic device 10a, using the weight values delivered by the multiplexer 19, obtains the total weight $Wt$ ($=\Sigma Wi$). It then performs the operation of Eq. (3) to obtain the deviation value A between the target value Wa and the total weight value Wt. The arithmetic device 20a delivers the deviation value A to the comparator 20q and gate 20p, and delivers the total weight Wt to the upper and lower limit comparators 20e and 20f, respectively. The comparator 20q compares the contents B of the minimum deviation register 20j and the deviation value A sent from the arithmetic device 20a, applying the gate enable signal to the gates 20p, 20n when A is smaller than B. Thus, gate 20p delivers the prevailing deviation value A to the minimum deviation register 20j to update its contents. The gate 20n updates the optimum combination memory 20m with the prevailing combination pattern, which is the other input to the gate, received from the combination pattern generator 15. Meanwhile, the upper and lower limit comparators 20e and 20f perform ranking processing by comparing the total weight value Wt with the upper and lower limit values Ma and Mi, respectively. The overweight signal OW (="1") is generated to increment the overweight counter 20i when Wt>Ma holds, the underweight signal UW (="1") is generated to increment the underweight counter 20g when Wt<Mi holds, and the the suitable weight signal SW (="1") is generated to increment the suitable weight counter 20h when Mi≦Wt≦Ma holds.

Thereafter, when the foregoing processing is completed for all combinations, the combination pattern generator 15 generates the signal CCED. When this occurs, the decision unit 21 determines whether the count in the suitable weight counter is one or more; if it is, the decision unit 21 sends the discharge enable signal DISC to the gate 22, whereby the combination pattern stored in the optimum combination memory 20m is delivered to the converter 18. Upon receiving the combination pattern via the gate 22 in response to generation of the discharge enable signal DISC, the converter 18 uses the stored correspondence between the bit positions and weighing machine numbers to generate the selected combination signal SCS, which enters the selected combination memory 23. The converter 18 simultaneously eliminates the selected weighing machines and creates a new correspondence table between the remaining, unselected weighing machines and the bit positions of the bit pattern. This selected combination signal SCS is applied to the drive control unit 28. The latter opens the weighing hopper gates of the weighing machines selected on the basis of the selected combination signal, whereby the articles contained in these hoppers are discharged.

It should be noted that the foregoing is for a case where the state of the suitable weight counter 20h is one or more, following the computation of all combinations, that is, for a case where a total combined weight value falling within the preset allowable limits is obtained. In a case where the state of the counter 20h is zero, the decision unit 21 applies the head number update signal HNC to the selected head number control unit 16 where a new selected head number i is determined in accordance with the magnitudes of the number of underweight counts $U_L$ and overweight counts $N_O$. Then, in accordance with the new value of i, combinations are computed again in order to obtain a combination giving a total combined weight value within the preset allowable limits. More specifically, when $N_O \geq N_U$ holds, the operation of Eq. (7) is performed to decrement the selected head number, when $N_O \leq N_U$ holds, the operation of Eq. (8) is performed to increment the selected head number, and the combination pattern generator 15 generates all combinations that select i weighing machines (i=m−1 or m+1) from among the n weighing machines, after which the combinatorial processing described above is executed. In a case where a combination giving a combined weight value within the preset allowable limits cannot be obtained, the operation specified by Eq. (7) or (8) is performed to change the selected head number until i=0 or i>N is obtained. When the condition i=0 or i>N is achieved, the selected head number control unit 16 sends the post-processing signal APS' to the post-processing circuit 27. The latter responds by checking the contents of the selected combination memory 23. If the contents have been cleared, this is taken as indicating that the articles have been discharged from the previously selected weighing machines, and the supply command signal SPL is delivered to the drive control unit 28. The latter responds by opening the pool hopper gates corresponding to the weighing machines that have discharged their articles in accordance with the combinatorial processing, thereby supply these weighing machines with articles anew. The distributing feeders corresponding to the emptied pool hoppers are vibrated for a predetermined period of time to resupply these pool hoppers with articles.

When, as a result of the first combinatorial computation, a(=m) weighing machines are selected as giving an optimum combination and the selected combination signal SCS is stored in the selected combination memory 23, the number a of selected weighing machines is delivered by the memory 23 to the unit 25 for calculating the number of combinations. When the value of a arrives and the discharge enable signal DISC is produced by the decision unit 21, the calculating unit 25 performs the operation of Eqs. (6) and (6'), thereby calculating the number Nc of combinations, which is applied to the comparator 26. The latter, just as at the start of operation, compares the limit value p with the value Nc. When Nc≧p is found to hold, processing is executed in the manner described above. The combination pattern generator 15 will generate all combinations that select m weighing machines from (N−a) weighing machines, rather than from N weighing machines. If, on the other hand, Nc<p holds, then the post-processing signal APS is applied to the post-processing circuit 27, and processing is executed in the same manner as when the post-processing signal APS' was generated, as described above.

In accordance with the present invention as described and illustrated hereinabove, the number of weighing machines is increased over that provided in the conventional apparatus (e.g., if the conventional apparatus has ten weighing machines, then the apparatus of this is invention is provided with 15), and the number of weighing machines that participate in combinations is varied in accordance with the target value (specifically, if the target value is increased, then the number of participating weighing machines is increased). Therefore, it is unnecessary to adjust the amount of articles supplied to each of the weighing hoppers in accordance with the target value, and the weighing hoppers can be designed to have a capacity best suited to the amount of articles supplied, thereby making possible a reduction in cost. Further, according to the invention, a limit value p for a number of combinations giving at least one total combined weight value within the preset allowable limits is predicted, and it is determined after a combinatorial computation, whether a number of combinations in excess of the limit value remain. If the decision is affirmative, then a second combinatorial computation is performed without any further supply of articles being carried out, and a desired combination is obtained from among the weighing machines that have not yet been selected, i.e., those weighing machines that have not yet discharged their articles. As a result, combinatorial weighing can be carried out at high speed. In addition, when the target value is small, a large number of desirable combinations and discharges can be achieved by a single supply and weight measurement cycle. This makes it possible to avoid an overabundance of articles due to excessive supply.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method in which weight data from a plurality of weighing machines containing articles, are combined to obtain an optimum combination of weighing machines giving a total combined weight value of articles equal to a target value or closest to the target value within preset allowable limits, and in which the articles are discharged from the obtained optimum combination of weighing machines, comprising the steps of:
    (a) predicting and entering a limit value p, p being an integer greater than or equal to one, for a number of combinations giving at least one total combined weight value within the preset allowable limits;
    (b) comparing a number $_nC_m$ of combinations and the limit value p, where n, being an integer greater than or equal to one, represents a number of weighing machines that have been supplied with articles, and $_nC_m$ represents a number of combinations that select m weighing machines, m being an integer greater than or equal to one, from the n weighing machines;
    (c) obtaining, when $_nC_m > p$ holds, an optimum combination of weighing machines giving a total combined weight value of articles equal to a target value or closest to the target value within the preset allowable limits, the optimum combination being obtained from among the combinations that select the m weighing machines from the n weighing machines;
    (d) discharging the articles from the obtained optimum combination of weighing machines;
    (e) performing the following operation:

$$n - a \rightarrow n$$

where a is an integer greater than or equal to one and represents a number of weighing machines selected as the optimum combination, and repeating said steps from step (b) onward without resupplying weighing machines with articles;
    (f) when $_nC_m < p$ holds, supplying articles afresh to the weighing machines that have discharged their articles, and repeating said steps from step (b) onward.

2. A method according to claim 1, wherein said step (b) comprises the substep of obtaining m by performing the following operation;

$$m = \text{INT}[X/y]$$

where y is an integer greater than or equal to one and represents the average value of the weight of articles supplied to one of the weighing machines, X is an integer greater than or equal to one and represents the target weight value, and m is an integer satisfying the following relation: $(m-1) < X/y \leq m$.

3. A method according to claim 1, further comprising the steps of:
    (g) determining whether the combined weight value is greater than an upper limit of the preset allowable limits, falls within the preset allowable limits, or is less than a lower limit of the preset allowable limits;
    (h) counting the number of combinations giving combined weight values greater than the upper limit of the preset available limits, within the preset allowable limits, and less than the lower limit of the preset allowable limits, thereby obtaining an overweight count, a suitable weight count, and an underweight count, respectively; and (i) determining whether the suitable weight count is one or more after generating all combinations that select m weighing machines from n weighing machines, and discharging articles in accordance with said step (d) when the suitable weight count is one or more.

4. A method according to claim 2, further comprising the steps of:

(g) determining whether the combined weight value is greater than an upper limit of the preset allowable limits, falls within the preset allowable limits, or is less than a lower limit of the preset allowable limits;

(h) counting the number of combinations giving the combined weight value greater than the upper limit of the preset allowable limits, within the preset allowable limits, and less than the lower limit of the preset allowable limits, thereby obtaining an overweight count, a suitable weight count, and an underweight count, respectively; and (i) determining whether the suitable weight count is one or more after generating all combinations that select m weighing machines from n weighing machines, and discharging articles in accordance with said step (d) when the suitable weight count is one or more.

5. A method according to claim 3, comprising the substep of comparing in magnitude, when the suitable weight count is zero, the overweight count and the underweight count, performing and operation $m-1 \rightarrow m$ in a case where the overweight count is equal to or greater than the underweight count, performing an operation $m+1 \rightarrow m$ when the overweight count is less than the underweight count, and obtaining the optimum combination, based on the m selected weighing machines obtained, giving a total weight value equal to the target value or closest to the target value within the preset allowable limits from among the combinations that select m weighing machines from n weighing machines.

6. A method according to claim 4, comprising the substep of comparing the magnitude, when the suitable weight count is zero, the overweight count and the underweight count, performing and operation $m-1 \rightarrow m$ when the overweight count is equal to or greater than the underweight count, performing an operation $m+1 \rightarrow m$ when the overweight count is less than the underweight count, and obtaining the optimum combination, based on the m selected weighing machines obtained, giving a total weight value equal to the target value or closest to the target value within the preset allowable limits from among combinations that select m weighing machines from n weighing machines.

7. A combinatorial weighing apparatus in which weight data from a plurality of weighing machines containing articles are combined to obtain an optimum combination of weighing machines giving a total combined weight value of articles equal to a target value or closest to the target value within preset allowable limits, and in which the articles are discharged from the obtained optimum combination of weighing machines, comprising:

limit value setting means for predicting and entering a limit p, p being an integer greater than or equal to one, of a number of combinations giving at least one total combined weight value within the preset allowable limits;

comparison means, operatively connected to said limit value setting means, for comparing a number $_nC_m$ of combinations and the limit value p, wherein n is an integer greater than or equal to one and represents a number of weighing machines that have been supplied with articles, and $_nC_m$ is an integer greater than or equal to one which represents a number of combinations that selects m weighing machines, m being an integer greater than or equal to one, from the n weighing machines;

combinatorial computing means, operatively connected to said weighing machines, for obtaining, when $_nC_m > p$ holds, an optimum combination of weighing machines giving the total combined weight value equal to the target value or closest to the target value within preset allowable limits, said optimum combination of weighing machines being obtained from among the combinations that select the m weighing machines from the n weighing machines;

means for discharging the articles from the obtained optimum combination of weighing machines;

means, operatively connected to said combinatorial computing means, for performing the following operation:

$$n - a \rightarrow n$$

wherein a is an integer greater than or equal to one and represents a number of weighing machines selected as the optimum combination, and for repeating the foregoing combinatorial weighing operation without resupplying the weighing machines with articles; and means, operatively connected to the weighing machines, for supplying articles afresh to the weighing machines that have discharged their articles, and for repeating the foregoing combinatorial weighing operation, when $_nC_m < p$ holds.

8. A combinatorial weighing method in which weight data from a plurality of weighing machines containing batches of articles, are combined to obtain an optimum combination of weighing machines giving a total combined weight value of the batches of articles equal to a target value or closest to the target value within preset allowable limits, and in which the batches of articles are discharged from the obtained optimum combination of weighing machines, comprising the steps of:

(a) predicting and entering a limit value for a number of combinations giving at least one total combined weight value within the preset allowable limits;

(b) obtaining an optimum combination of weighing machines having a total combined weight value of batches of articles equal or closest to the target value within the preset allowable limits when the number of combinations of the selected weighing machines is greater than the limit value;

(c) selecting an optimum combination of a predetermined number of weighing machines and determining the number of combinations of the selected weighing machines available;

(d) comparing the number of combinations of the selected weighing machines with the limit value and repeating said steps from said step (b) onward;

(e) discharging articles from the obtained optimum combination of weighing machines; and (f) supplying the discharged weighing machines with articles when the number of combinations of the selected weighing machines is less than the limit value.

9. A combinatorial weighing apparatus in which weight data from a plurality of weighing machines containing batches of articles are combined to obtain an optimum combination of weighing machines giving a total combined weight value of batches of articles equal to a target value or closest to the target value within preset allowable limits, and in which the batches of articles are discharged from the obtained optimum combination of weighing machines, said combinatorial weighing apparatus comprising:

limit value setting means for predicting and setting a limit value corresponding to a number of combinations giving at least one total combined weight value within the preset allowable limits;

combinatorial computing means, operatively connected to said weighing machines, for obtaining an optimum combination of weighing machines giving the total combined weight value equal or closest to the target value within preset allowable limits when the number of combinations of weighing machines is greater than the limit value;

means, operatively connected to said combinatorial computing means, for selecting an optimum combination of a predetermined number of weighing machines and determining the number of combinations of selected weighing machines that are available;

comparison means, operatively connected to said means for selecting, for comparing the number of combinations of selected weighing machines to determine whether they fall within the limit value;

means, operatively connected to said means for selecting and said comparison means, for discharging the batches of articles from the obtained optimum combination of weighing machines; and means, operatively connected to the weighing machines; for supplying articles to the weighing machines that have been discharged when the number of combinations of weighing machines is less than the limit value, otherwise, the foregoing combinatorial weighing apparatus carries out the combinatorial weighing operation with the weighing machines that have not been discharged.

* * * * *

UNITED STATES PATENT AND TRADEMARK OFFICE
CERTIFICATE OF CORRECTION

PATENT NO. : 4,511,010
DATED : APRIL 16, 1985
INVENTOR(S) : TAKASHI SASHIKI ET AL.

It is certified that error appears in the above-identified patent and that said Letters Patent is hereby corrected as shown below:

Col. 5, line 61, "(for" should be --for--.

Col. 6, line 4, "X/y." should be --X/y).--.

Signed and Sealed this

Thirteenth Day of August 1985

[SEAL]

Attest:

DONALD J. QUIGG

Attesting Officer     Acting Commissioner of Patents and Trademarks